INVENTOR
ROBERT FOWLER GILCHRIST

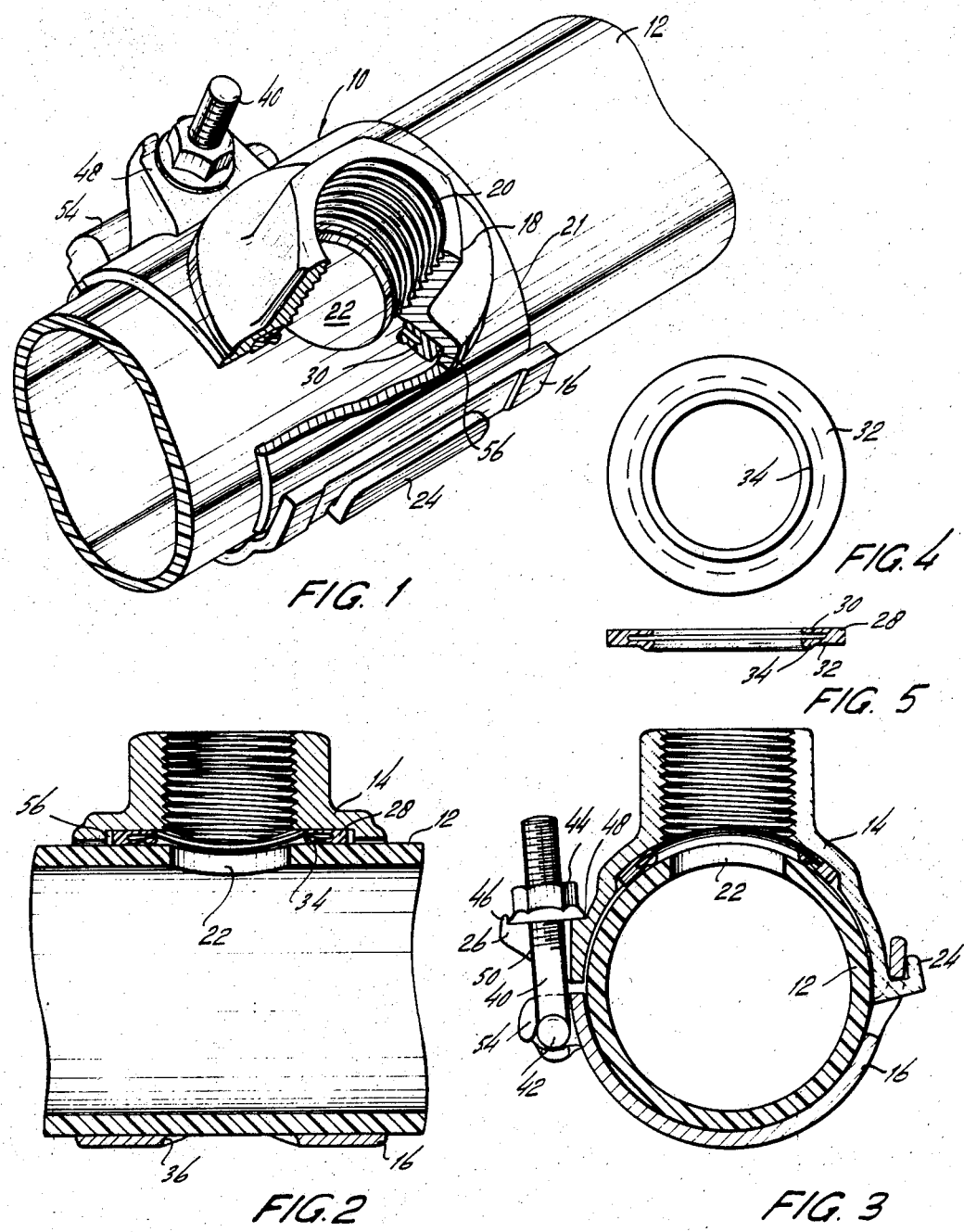

BY *Semmes and Semmes*

ATTORNEYS 3,471,176
TAPPING SADDLE
Robert F. Gilchrist, Wichita Falls, Tex., assignor to Vega Manufacturing Corporation, Wichita Falls, Tex., a corporation of Texas
Filed June 10, 1968, Ser. No. 735,910
Int. Cl. F16l 41/04
U.S. Cl. 285—111                                    2 Claims

ABSTRACT OF THE DISCLOSURE

A tapping saddle circumferentially clamped about a main pipe so as to support an extension pipe and compressible gasket in juxtaposition with a hole tapped in the main pipe.

BACKGROUND OF THE INVENTION

The invention

Tapping saddles are used in the pipe fitting industry to support an extension pipe in juxtaposition with a hole tapped in a main pipe line. In fitting of tapping saddles about plastic main pipe extensions considerable difficulties are encountered. Since plastic pipe can expand and deform under conditions of increased temperature, retaining of a compressed gasket around the tapped hole is difficult. Also, the extreme clamping pressure necessitated in compression a gasket around the tapped hole eventually deforms the main plastic pipe section and results in loss of sealing gasket compression.

Description of the prior art

Prior art tapping saddles have included top and bottom housing pieces clampable towards each other and around a main pipe section (see Risley 2,790,652; Powell 1,616,390 and Bober 2,512,009). However, the gaskets employed in such conventional devices have either been of the flat aperture type or a circular solid bead type. Principal shortcomings of either the solid flat type or the circular bead type is their relative lack of compressibility, necessitating increased clamping compression forces to obtain a sufficient seal about the hole made in the main pipe. This shortcoming is not debilitating in the fitting of cast iron or metal pipe sections together. However, in fitting of the currently popular plastic sections together, the high compressive forces result in distortions of the plastic pipe. These distortions prevent adequate sealing about the tapped hole and, of course, in hot weather result in a flowing of the pipe through apertures in the top and bottom clamping sections and away from the compressive force of the solid gasket flat or bead seal.

Dual lip compressive gaskets have been used in "bell" pipe sections, the gaskets compressing upon entry of the "spigot" as in Stitzer 2,083,966, FIG. 1. Such dual lip gaskets have been supported in a plane parallel to the main pipe section and due to the intervening spigot have not been compressed to any degree by the pressure in the main pipe line.

Applicant distinguishes from these constructions in that in his dual lip gasket the inner sealing lip is supported in a plane perpendicular to the main pipe axis and is offset with respect to the inside wall of the clamping top piece permitting sealing compression under minimal clamping pressure, as illustrated in FIG. 2 without distorting the main pipe.

SUMMARY OF THE INVENTION

A tapping saddle including a top piece with a pipe extension aperture and a compressible gasket fitted peripherally of said aperture and inwardly of said top piece and a bottom piece hingedly connected to said top piece and compressible with said top piece about a main pipe section tapped hole. A T-bolt is used to compress the bottom and top sections about a pipe. The gasket is a unique dual lip configuration having a base or sealing lip and a radially inwardly extending compression lip, the compression lip having a sealing bead which surrounds the hole tapped in the main pipe. The dual lip gasket is uniquely supported around the tapped hole and in a plane at right angles to the axis of the main pipe. The device is particularly adaptable to clamping around tapped holes made in plastic pipe sections. Since the dual lip gasket is resilient, less clamping pressure is required to effect a seal around the tapped hole and, the water pressure in the main pipe actually increases the seal.

BRIEF DESCRIPTION OF THE DRAWINGS

FIG. 1 is a perspective view, partially fragmentary, showing the top and bottom sections clamped about a main pipe, so as to compress dual lip gasket 30 around hole 22 tapped in the main pipe;

FIG. 2 is a vertical section of the main pipe and tapping saddle top and bottom;

FIG. 3 is a transverse section thereof;

FIG. 4 is a top plan of the dual lip sealing gasket;

FIG. 5 is a vertical section of the gasket showing sealing bead 34 on the inner compressing lip;

DESCRIPTION OF THE PREFERRED EMBODIMENTS

Figure 6:
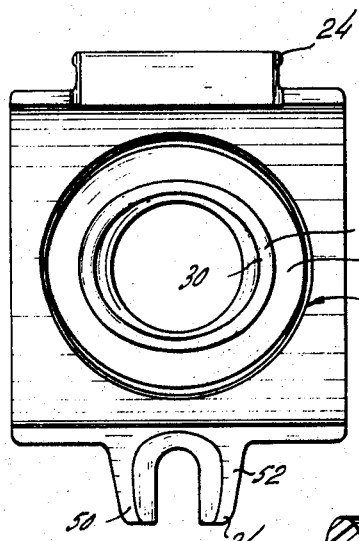
FIG. 6 is a bottom plan of the top section showing the dual sealing lips 30, 34 of the sealing gasket.
Figure 7:
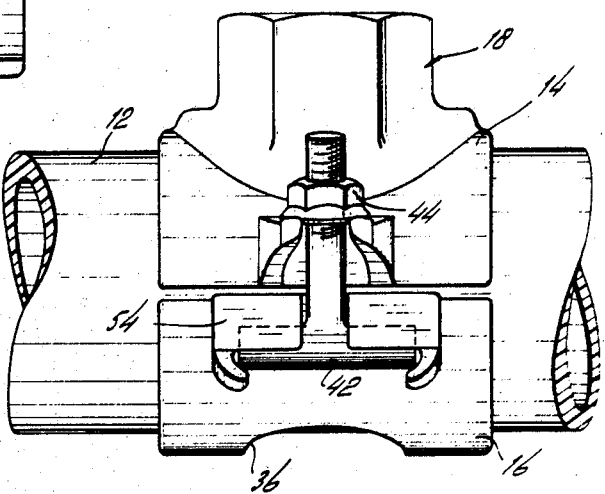
FIG. 7 is a side elevation showing the T-bolt used to compress the sections one to the other.
Figure 8:
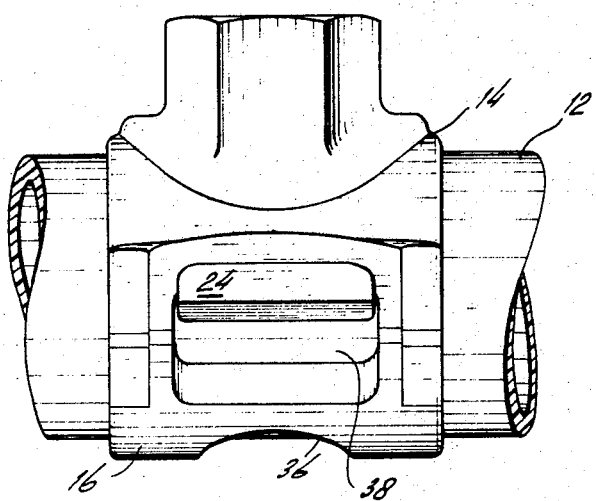
FIG. 8 is a rear elevation showing the hinged locking of the pieces one to the other.

In FIG. 1 a main pipe section is shown fragmentarily with tapping saddle 10 clamped circumferentially thereon. Tapping saddle 10 includes top section 14 hingedly connected to bottom piece 16 by means of hinge tab 24 extending through aperture 38 in bottom section 16. Top section 14 includes a throat 18 having a threaded aperture 20, coaxially alignable with a hole 22 tapped in main pipe 12 and a radially extending flange 18 defining an inner gasket recess 56.

As illustrated in FIG. 6, top section compression seat 48 is defined by means of ears 50 and 52, terminating in upwardly extending identical flanges 46.

Bottom section 16 includes hinging aperture 38, an optimal pipe section bottom aperture 36 and a compression housing 54 into which the T-extension 42 of compression bolt 40 may be rotatably fitted.

As the pipe extension aperture 20 is coaxially aligned with tapped hole 22, the top and bottom sections are compressed by fitting the bolt shank 40 within ears 50 and 52 and by turning nut 44 so as to compress the top and bottom sections to abutting relationship and simultaneously compressing dual lip gasket 30 to the position illustrated in FIGS. 2 and 3.

Dual lip gasket 30 includes base lip 32 which may be adhesively sealed or cemented in recess 56 and a compression lip 34 having a half O-ring or bead 34 on its inner periphery.

Sealing gasket 30 is illustrated in FIG. 3 in its state prior to full clamping compression and being radially inset with respect to the top section. As the top section 14 and bottom section 16 are closed tightly together, the gasket compression lip 34 is compressed inwardly towards the base or sealing lip 30 as illustrated in FIG. 2. The greater the water pressure in main line 12, of course, the stronger the compressive seal. Various types of quick-connect assemblies other than T-bolt 40 may be provided. However, an important feature of the invention is the total lateral support of the compressed pipe by means of the overlapping top and bottom sections 14–16 in combination with the uniquely positioned dual lip seal. The half O-ring 34 in addition to enhancing sealing around the tapped hole prevents inner lip 32 from tearing.

According to the present invention, increased water pressure provides an increased seal and the inner lip provides increased seal with less pressure and more resiliency enabling adaptability of plastic pipe to changing climatic and water pressure conditions.

Manifestly, the top and bottom clamping sections and the O-ring gasket may be varied.

I claim:

1. A tapping saddle of the type used for supporting an extension pipe in juxtaposition with a hole tapped in a main pipe comprising:
   (A) a housing circumferentially contractible about said main pipe and including:
      (i) an upper portion configured to fit approximately half-way around the pipe top and having a radially outwardly extending pipe extension aperture alignable with the hole tapped in said main pipe and a gasket recess opening inwardly and defined peripherally outwardly of said aperture, so as to support a duel lip gasket concentrically with said pipe axis, said top piece further including:
         (a) a rectangular hinge locking tab aligned with the pipe axis; and
         (b) a bifurcated compression seat; and
      (ii) a lower portion configured to fit half-way around the bottom of a pipe; and having:
         (a) a hinge aperture on one side aligned with the main pipe axis and complementally configured with said hinge locking tab at one side, so as to align said upper and lower portions when said tab is inserted within said aperture; and
         (b) a compression seat at the other side aligned with the pipe axis;
   (B) a dual lip gasket supported within asid housing peripherally of said tapped hole, so as to be intermediate said main pipe and said pipe extension aperture within the recess in said top piece, said gasket being radially inset with respect to the inner wall of said gasket recess in said upper portion, so as to be compressible by said main pipe fitting within said saddle and said gasket including:
      (i) a base lip sealable within said recess, and
      (ii) an inner compression lip compressible against said base upon fitting of said main pipe within said saddle, said inner compression lip including a semicircular bead peripherally defining an area of sealing around the hole tapped in said main pipe and being of sufficient thickness so as to increase the compression of the sealing lips against the main pipe and under the saddle to form a better seal; and
   (C) a locking piece having a head seated against rotation in said lower portion compression seat and a threaded shank being securable in said top piece compression seat via nut means.

2. A tapping saddle as in claim 1, said lower portion compression seat being in parallel alignment with said hinge aperture, so that said seat cooperates with the locking piece head when under compression to bias both said top portion and bottom portion into alignment with the axis of the main pipe.

References Cited

UNITED STATES PATENTS

| | | | |
|---|---|---|---|
| 2,837,383 | 6/1958 | Skelly | 285—367 X |
| 3,158,379 | 11/1964 | Nava et al. | 277—206 |
| 3,189,359 | 6/1965 | Haberkorn | 277—205 |
| 2,790,652 | 4/1957 | Risley et al. | 285—197 X |
| 2,933,126 | 4/1960 | Webber et al. | |
| 3,360,284 | 12/1967 | Ver Nooy | 285—110 |

DAVID J. WILLIAMOWSKY, Primary Examiner

WAYNE L. SHEDD, Assistant Examiner

U.S. Cl. X.R.

285—197, 283, 373